US011088600B2

(12) United States Patent
Sameshima et al.

(10) Patent No.: US 11,088,600 B2
(45) Date of Patent: Aug. 10, 2021

(54) METHOD FOR MANUFACTURING ROTOR CORE

(71) Applicant: Mitsui High-tec, Inc., Kitakyushu (JP)

(72) Inventors: Kei Sameshima, Kitakyushu (JP); Shoichi Ono, Kitakyushu (JP); Go Kato, Kitakyushu (JP)

(*) Notice: Subject to any disclaimer, the term of this patent is extended or adjusted under 35 U.S.C. 154(b) by 237 days.

(21) Appl. No.: 16/129,600

(22) Filed: Sep. 12, 2018

(65) Prior Publication Data
US 2019/0089229 A1 Mar. 21, 2019

(30) Foreign Application Priority Data

Sep. 19, 2017 (JP) .............................. JP2017-178705

(51) Int. Cl.
H02K 15/02 (2006.01)
G01B 21/18 (2006.01)
H02K 1/27 (2006.01)
H02K 15/03 (2006.01)

(52) U.S. Cl.
CPC .......... H02K 15/024 (2013.01); G01B 21/18 (2013.01); H02K 1/27 (2013.01); H02K 15/03 (2013.01); *H02K 2213/03* (2013.01)

(58) Field of Classification Search
CPC ........ H02K 15/024; H02K 1/27; H02K 15/03; G01B 21/18
See application file for complete search history.

(56) References Cited

U.S. PATENT DOCUMENTS

| 7,897,089 B2 * | 3/2011 | Matsubayashi ....... B29C 45/021 |
| | | 264/279 |
| 10,532,501 B2 * | 1/2020 | Okudaira ............... H02K 15/03 |
| 2005/0110000 A1 | 5/2005 | Iida et al. |
| 2009/0045689 A1 * | 2/2009 | Haruno .................. H02K 15/03 |
| | | 310/156.56 |

(Continued)

FOREIGN PATENT DOCUMENTS

| CN | 104704714 | 6/2015 |
| GB | 2520657 | 5/2015 |

(Continued)

OTHER PUBLICATIONS

Extended Search Report in corresponding European Application No. 18192771.6, dated Nov. 20, 2018.

*Primary Examiner* — Minh N Trinh
(74) *Attorney, Agent, or Firm* — Soei Patent & Law Firm

(57) ABSTRACT

A method for manufacturing a rotor core includes detecting a height of a projecting portion formed on a lower die by a height detecting unit, and placing onto the lower die a core body in which a magnet insertion hole is formed such that the projecting portion is positioned in the magnet insertion hole when the height detecting unit has determined that the height of the projecting portion is within a set range. Additionally, the method includes bringing a permanent magnet in the magnet insertion hole into contact with an upper end of the projecting portion, and placing onto the core body a holding member after bringing the permanent magnet into contact with the upper end of the projecting portion. Melted resin is injected into the magnet insertion hole in which the permanent magnet has been inserted after placing the holding member onto the core body.

9 Claims, 11 Drawing Sheets

(56) References Cited

U.S. PATENT DOCUMENTS

| | | | | |
|---|---|---|---|---|
| 2014/0109391 A1* | 4/2014 | Matsubayashi | ........ | H02K 15/03 29/596 |
| 2015/0236558 A1 | 8/2015 | Oketani et al. | | |
| 2019/0089229 A1* | 3/2019 | Sameshima | ............ | H02K 15/03 |

FOREIGN PATENT DOCUMENTS

| | | |
|---|---|---|
| JP | 2005-312259 | 11/2005 |
| JP | 2007-318942 | 12/2007 |
| JP | 2012-093360 | 5/2012 |
| JP | 2013-009453 | 1/2013 |
| JP | 2014-046553 | 3/2014 |
| JP | 2015-192573 | 11/2015 |
| WO | 2012/026003 | 3/2012 |

\* cited by examiner

Fig.4
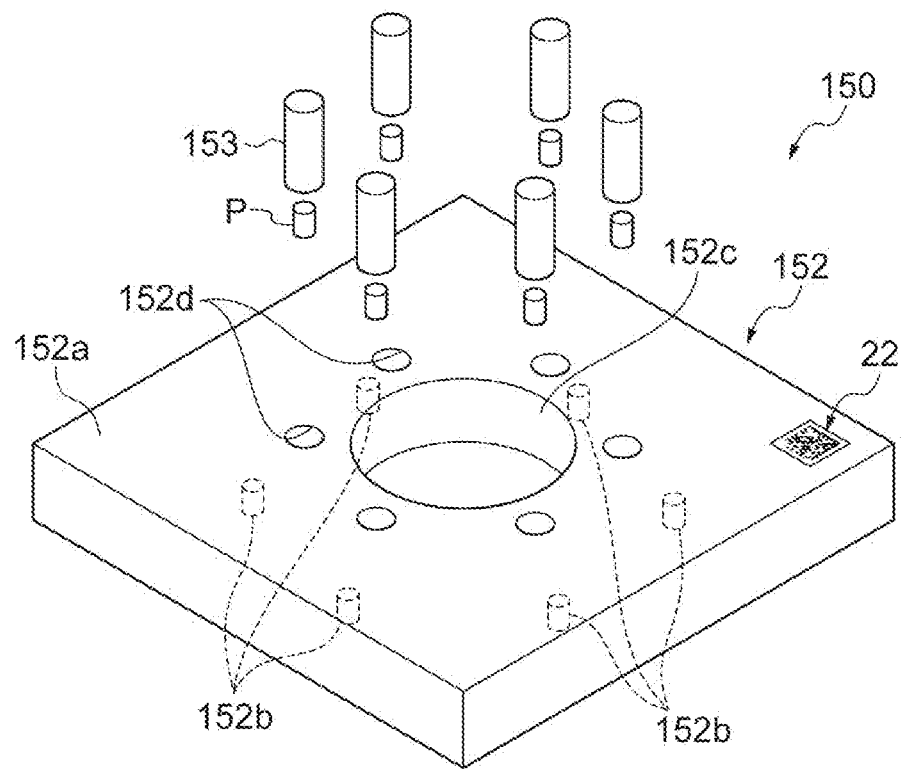
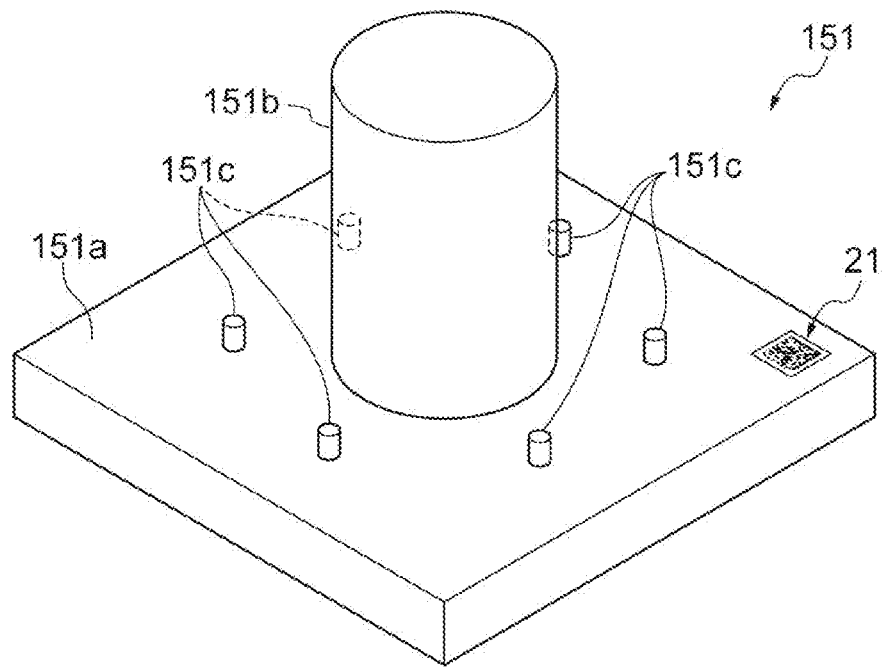

METHOD FOR MANUFACTURING ROTOR CORE

CROSS-REFERENCE TO RELATED APPLICATIONS

This application claims the benefit of priority from Japanese Patent Application No. 2017-178705, filed Sep. 19, 2017, the entire contents of which are incorporated herein by reference.

FIELD

This application generally relates to a method for manufacturing a rotor core.

BACKGROUND

A rotor core commonly includes: a core body in which a plurality of magnet insertion holes passing through the core body in a height direction thereof are formed around the rotation axis at predetermined intervals; permanent magnets disposed in the respective magnet insertion holes; and solidified resins charged into the respective magnet insertion holes and solidified therein. In order to promote the injection of melted resin into the magnet insertion holes and adjust the weight balance of the rotor core, for example, positions of the permanent magnets in the magnet insertion holes may be controlled.

Japanese Unexamined Patent Publication No. 2015-192573 discloses a method for manufacturing a rotor core, the method including: placing a core body on a lower die having projecting portions (protrusions) at positions corresponding to magnet insertion holes; disposing permanent magnets in magnet insertion holes such that the permanent magnets are in contact with projecting portions positioned in the magnet insertion holes; and injecting melted resin into the magnet insertion holes and curing the melted resin therein. In this method, the positions of the permanent magnets in the magnet insertion holes can be controlled based on the heights of the projecting portions.

SUMMARY

A method for manufacturing a rotor core according to one aspect of the present disclosure includes detecting a height of a first projecting portion formed on a lower die by a height detecting unit, and placing onto the lower die a core body in which a magnet insertion hole passing through the core body in a height direction thereof is formed such that the first projecting portion is positioned in the magnet insertion hole. The method may further include bringing a permanent magnet in the magnet insertion hole into contact with an upper end of the first projecting portion, and placing onto the core body a holding member configured to hold the core body with the lower die after bringing the permanent magnet into contact with the upper end of the first projecting portion. Melted resin may be injected into the magnet insertion hole in which the permanent magnet has been inserted after placing the holding member onto the core body.

A method for manufacturing of a rotor core according to another aspect of the present disclosure includes placing onto a lower die a core body in which a magnet insertion hole passing through the core body in a height direction thereof is formed such that a first projecting portion formed on the lower die is positioned in the magnet insertion hole, and bringing a permanent magnet in the magnet insertion hole into contact with an upper end of the first projecting portion. Additionally, the method may comprise placing onto the core body a holding member configured to hold the core body with the lower die after bringing the permanent magnet into contact with the upper end of the first projecting portion, and injecting melted resin into the magnet insertion hole in which the permanent magnet has been inserted after placing the upper die onto the core body. Still further, the method may comprise removing the lower die and the holding member from the core body after injecting the melted resin into the magnet insertion hole to form a depression on a lower end portion of a solidified resin formed by solidifying the melted resin, the lower end portion corresponding to the first projecting portion, and detecting a depth of the depression by a depth detecting unit.

BRIEF DESCRIPTION OF THE DRAWINGS

FIG. 4 is a perspective view illustrating a resin charging mechanism;

DETAILED DESCRIPTION

In the following description, with reference to the drawings, the same reference numbers are assigned to the same components or to similar components having the same function, and overlapping description is omitted.

Configuration of Stacked Rotor Core

Figure 1:
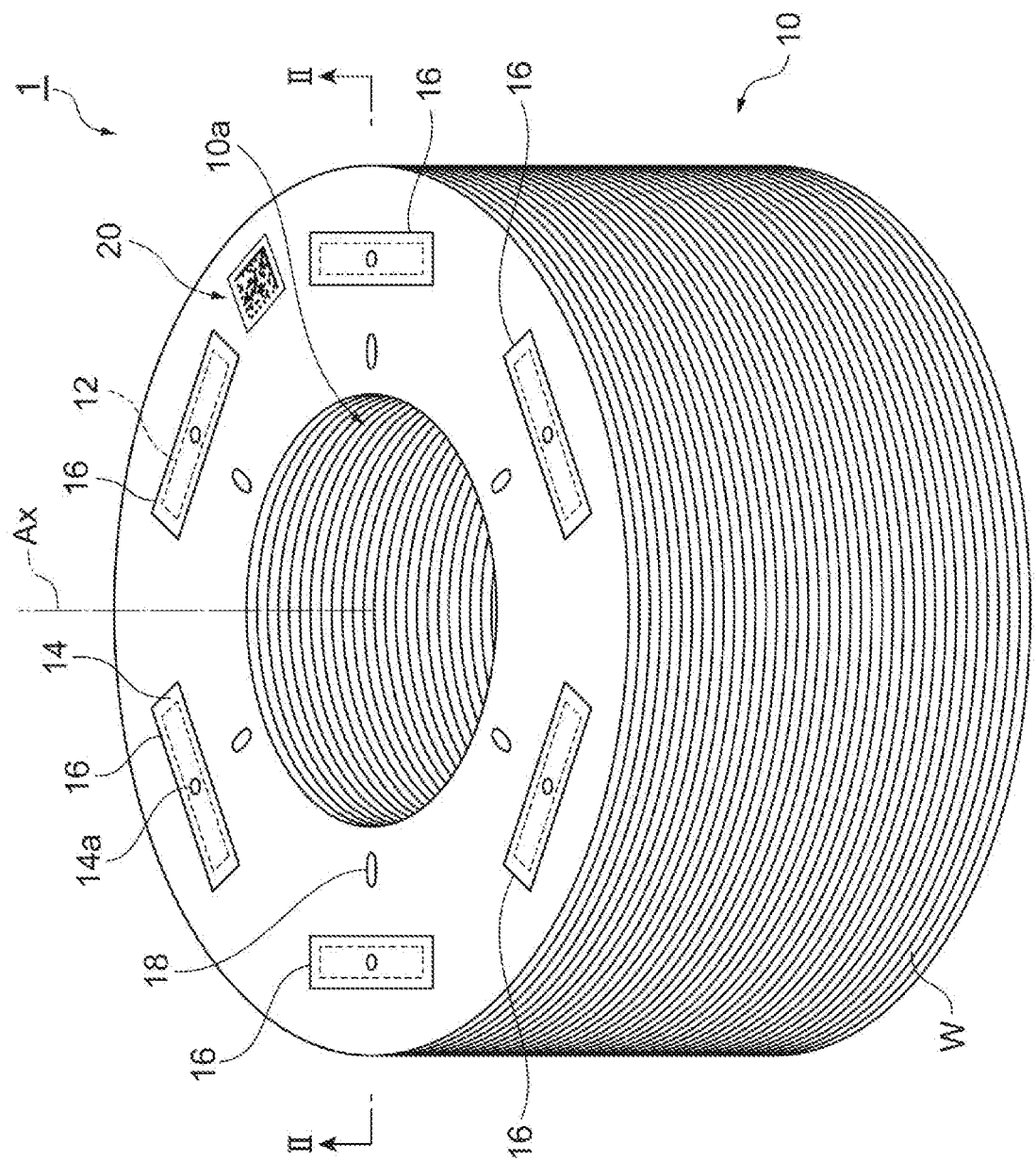
FIG. 1 is a perspective view illustrating an example stacked rotor core.
Figure 2:
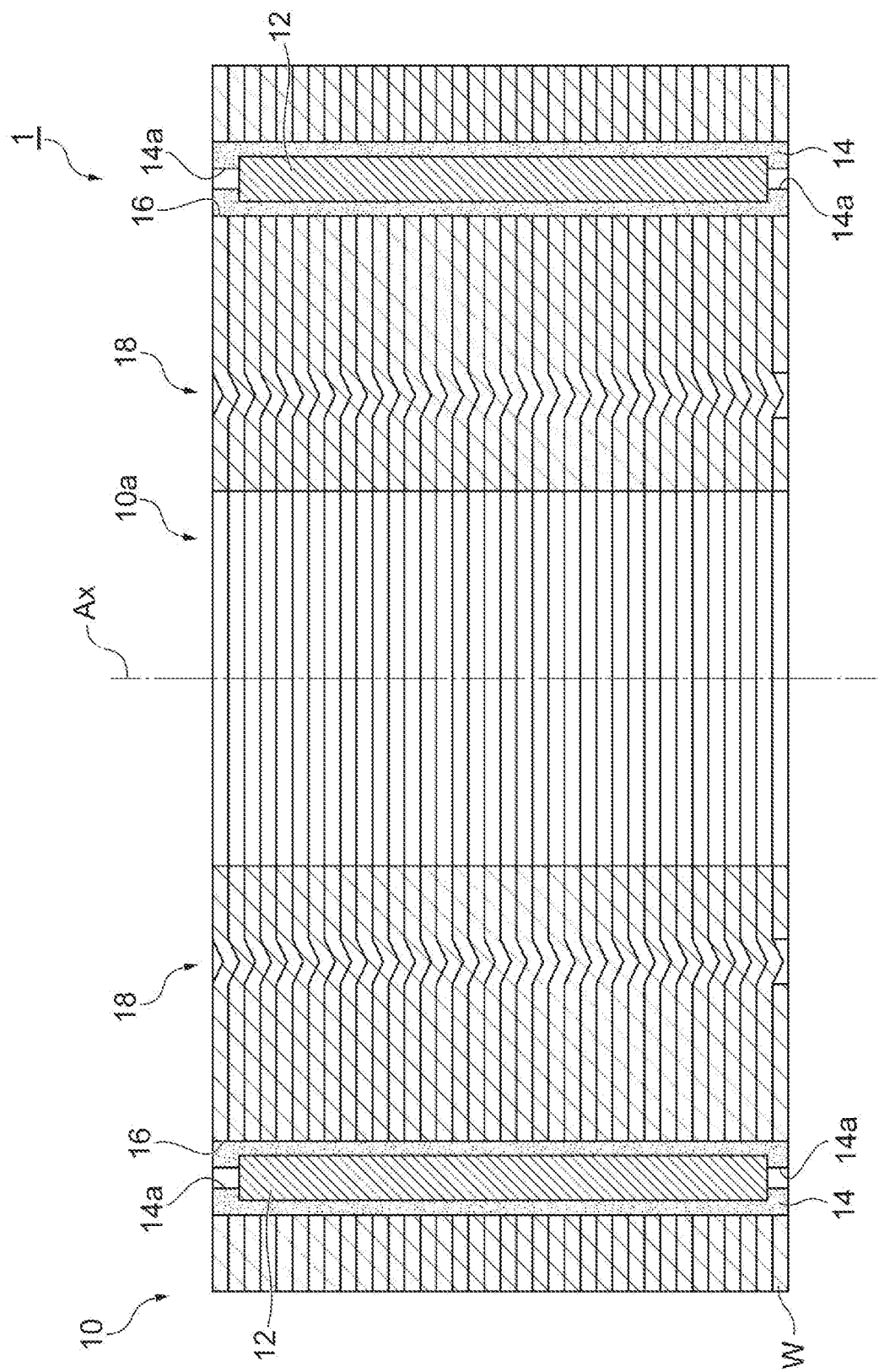
FIG. 2 is a sectional view taken along line II-II in FIG. 1.

With reference to FIG. 1 and FIG. 2, a configuration of a stacked rotor core 1 (rotor core) will be described first. The stacked rotor core 1 is part of a rotor. By attaching end plates and a shaft to the stacked rotor core 1, a rotor is formed. By assembling the rotor with a stator, a motor is formed. The stacked rotor core 1 may be used for an interior permanent magnet (IPM) motor. As depicted in FIG. 1, the stacked rotor core 1 includes a stack 10 (core body), a plurality of permanent magnets 12, a plurality of solidified resins 14, and an identification code 20.

The stack 10 has a cylindrical shape as depicted in FIG. 1. For example, in a central portion of the stack 10, a shaft hole 10a that passes through the stack 10 so as to extend along a central axis Ax thereof is formed. In other words, the shaft hole 10a extends in a height direction (stacking direction) of the stack 10. The height direction is also the lengthwise direction of the central axis Ax. In FIG. 1, the stack 10 is rotated about the central axis Ax, and thus the central axis Ax is also a rotation axis. A shaft may be inserted into the shaft hole 10a.

In the stack 10, a plurality of magnet insertion holes 16 are formed. As depicted in FIG. 1, the magnet insertion holes 16 are aligned along the outer periphery of the stack 10 at predetermined intervals. As depicted in FIG. 2, the magnet insertion holes 16 pass through the stack 10 so as to extend along the central axis Ax. In other words, the magnet insertion holes 16 extend in the height direction.

In some examples, each magnet insertion hole 16 has the shape of a long hole extending along the outer periphery of the stack 10. The number of the magnet insertion holes 16 is six in the example stacked rotor core 1 of FIG. 1. The positions, the shapes, and the number of the magnet insertion holes 16 may be changed based on intended use and required performance, for example, of the motor.

The stack 10 is formed by stacking a plurality of blanked members W. Each blanked member W is a plate-like member obtained by blanking an electromagnetic steel sheet ES described later in a predetermined shape, and has a shape corresponding to the shape of the stack 10. The stack 10 may be formed by a rotational stack. The term "rotational stack" means stacking a plurality of blanked members W while displacing the angles between the blanked members W relative to one another. The rotational stack is performed mainly for the purpose of offsetting the deviation in plate thickness of the blanked members W. The angle of the rotational stack may be set at any angle.

Blanked members W adjacent in the height direction may be fastened together by interlocking portions 18 as depicted in FIG. 1 and FIG. 2. These blanked members W may be fastened together by various known methods instead of the interlocking portions 18. For example, the blanked members W may be bonded together with adhesive or resin material, or may be bonded together by welding. Alternatively, a temporarily-interlocking portion may be formed on each blanked member W, the blanked members W may be fastened together by the temporarily-interlocking portions to form a stack 10, and then the temporarily-interlocking portions may be removed from this stack. The term "temporarily-interlocking portion" means a swaged area that is used to temporarily integrate a plurality of blanked members W together and is removed in a process of manufacturing a product (stacked rotor core 1).

The permanent magnets 12 have been inserted into the respective magnet insertion holes 16 one by one as depicted in FIG. 1 and FIG. 2. In some examples, the shape of each permanent magnet 12 has, but is not limited to, a rectangular parallelepiped shape. The type of the permanent magnet 12 may be determined based on intended use and required performance, for example, of the motor, and may be a sintered magnet or a bond magnet, for example.

Each solidified resin 14 is a resin formed by charging melted resin material (melted resin) into the magnet insertion holes 16 into which the permanent magnets 12 have been inserted and then solidifying the melted resin. The solidified resins 14 have a function of fixing the permanent magnets 12 in the magnet insertion holes 16 and a function of bonding the blanked members W adjacent in the height direction (vertical direction) to each other. Examples of resin material forming each solidified resin 14 include a thermosetting resin and a thermoplastic resin. Specific examples of the thermosetting resin include resin compositions containing an epoxy resin, a curing initiator, and an additive. Examples of the additive include a filler, a flame retardant, and a stress-lowering agent.

As depicted in FIG. 1 and FIG. 2, in an upper end portion and a lower end portion of each solidified resin 14, columnar depressions 14a are formed. From bottom surfaces of the depressions 14a, the permanent magnets 12 are exposed. In some examples, each permanent magnet 12 is positioned between the corresponding pair of depressions 14a and in a midpoint of the corresponding magnet insertion hole 16 in the height direction.

The identification code 20 is provided on a surface (an upper surface or a lower surface) of the stack 10, that is, an outer surface of a blanked member W in the uppermost layer or the lowermost layer of the stack 10. The identification code 20 has a function of storing and/or identifying individual information (e.g., product type, date and time of manufacture, used material, manufacturing line) of the stacked rotor core 1 including the identification code 20. The identification code 20 is not limited to a particular type of information, and can be used to store the individual information by a combination of light and dark patterns, and may be a bar code or may be a two-dimensional code, for example. Examples of the two-dimensional code include QR code (registered trademark), DataMatrix, and Vericode. As depicted in FIG. 1, the identification code 20 may form a predetermined pattern with a combination of a white background area and a black marking.

Manufacturing Device for Stacked Rotor Core

Figure 3:
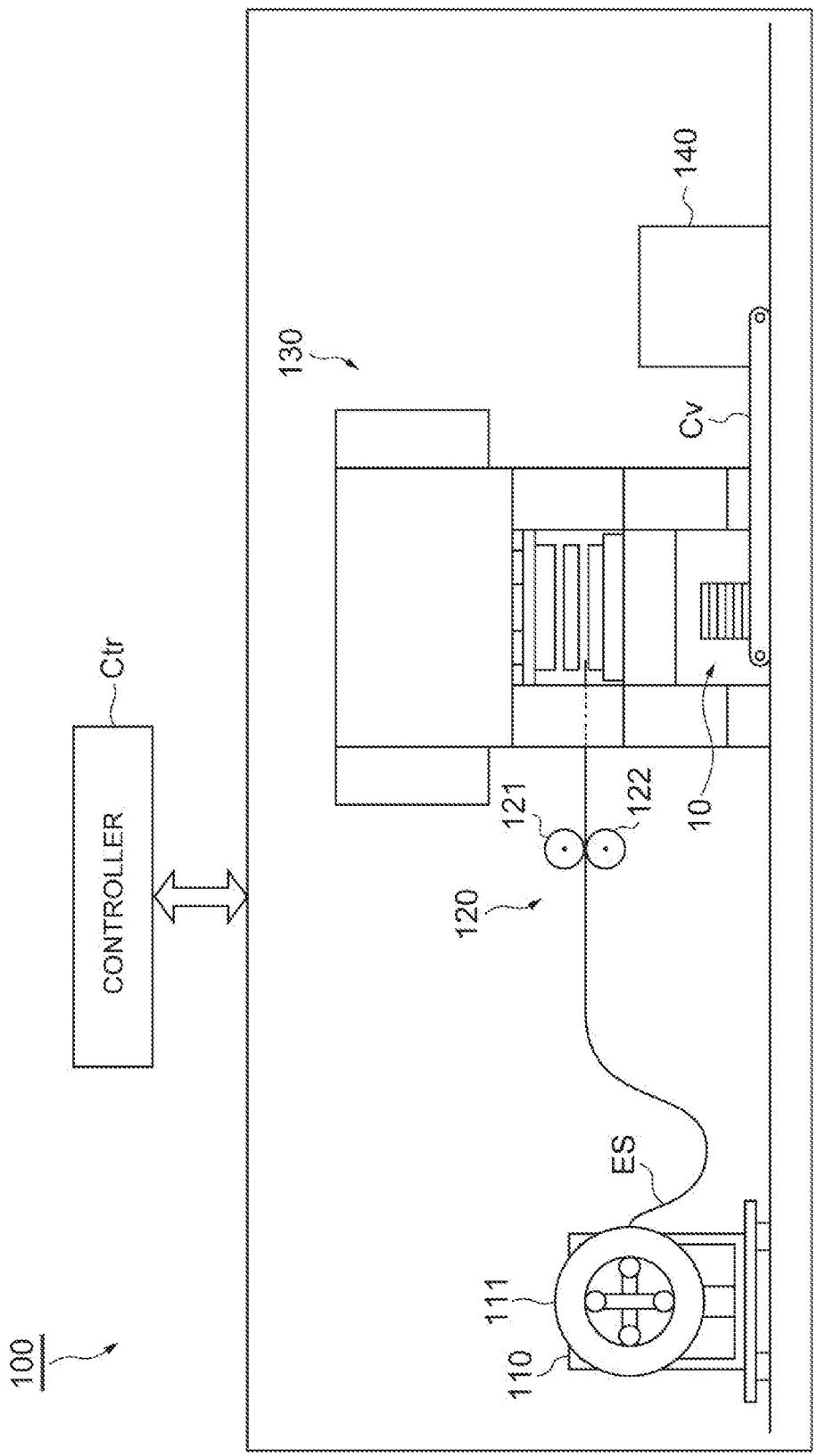
FIG. 3 is a schematic diagram illustrating an example manufacturing device for the stacked rotor core.

The following describes a manufacturing device 100 for the stacked rotor core 1 with reference to FIG. 3.

The manufacturing device 100 is a device configured to manufacture the stacked rotor core 1 from an electromagnetic steel sheet ES (sheet to be processed) that is a belt-like metal sheet. The manufacturing device 100 includes an uncoiler 110, a feeder 120, a blanking device 130, a magnet mounting device 140, and a controller Ctr (control unit).

The uncoiler 110 rotatably supports a coiled material 111 that is a belt-like electromagnetic steel sheet ES wound in a coiled shape, with the coiled material 111 being mounted thereon. The feeder 120 has a pair of rollers 121 and 122 configured to sandwich the electromagnetic steel sheet ES from above and below. The pair of rollers 121 and 122 rotates and stops in response to instruction signals from the controller Ctr, thereby intermittently feeding the electromagnetic steel sheet ES toward the blanking device 130 in sequence.

The blanking device 130 operates in response to instruction signals from the controller Ctr. The blanking device 130 has a function of forming the blanked members W by blanking the electromagnetic steel sheet ES that is intermittently fed by the feeder 120 and a function of manufacturing a stack 10 by stacking blanked members W obtained by the blanking.

After being discharged from the blanking device 130, the stack 10 is placed on a conveyor Cv that is provided in a manner extending between the blanking device 130 and the magnet mounting device 140. The conveyor Cv operates in response to instruction signals from the controller Ctr to feed the stack 10 to the magnet mounting device 140. Herein, between the blanking device 130 and the magnet mounting device 140, the stack 10 may be conveyed by means other than the conveyor Cv. For example, the stack 10 may be manually conveyed while being placed in a container.

The magnet mounting device 140 operates in response to instruction signals from the controller Ctr. The magnet mounting device 140 has a function of inserting the permanent magnets 12 into the respective magnet insertion holes 16 and a function of charging melted resin into the magnet insertion holes 16 into which the permanent magnets 12 have been inserted.

The controller Ctr generates, for example, based on a program recorded in a recording medium (not depicted) or operation inputs from an operator, the respective instruction signals for causing each of the feeder 120, the blanking device 130, and the magnet mounting device 140 to operate, and transmits the respective instruction signals to the feeder 120, the blanking device 130, and the magnet mounting device 140.

Details of Magnet Mounting Device

Figure 5:
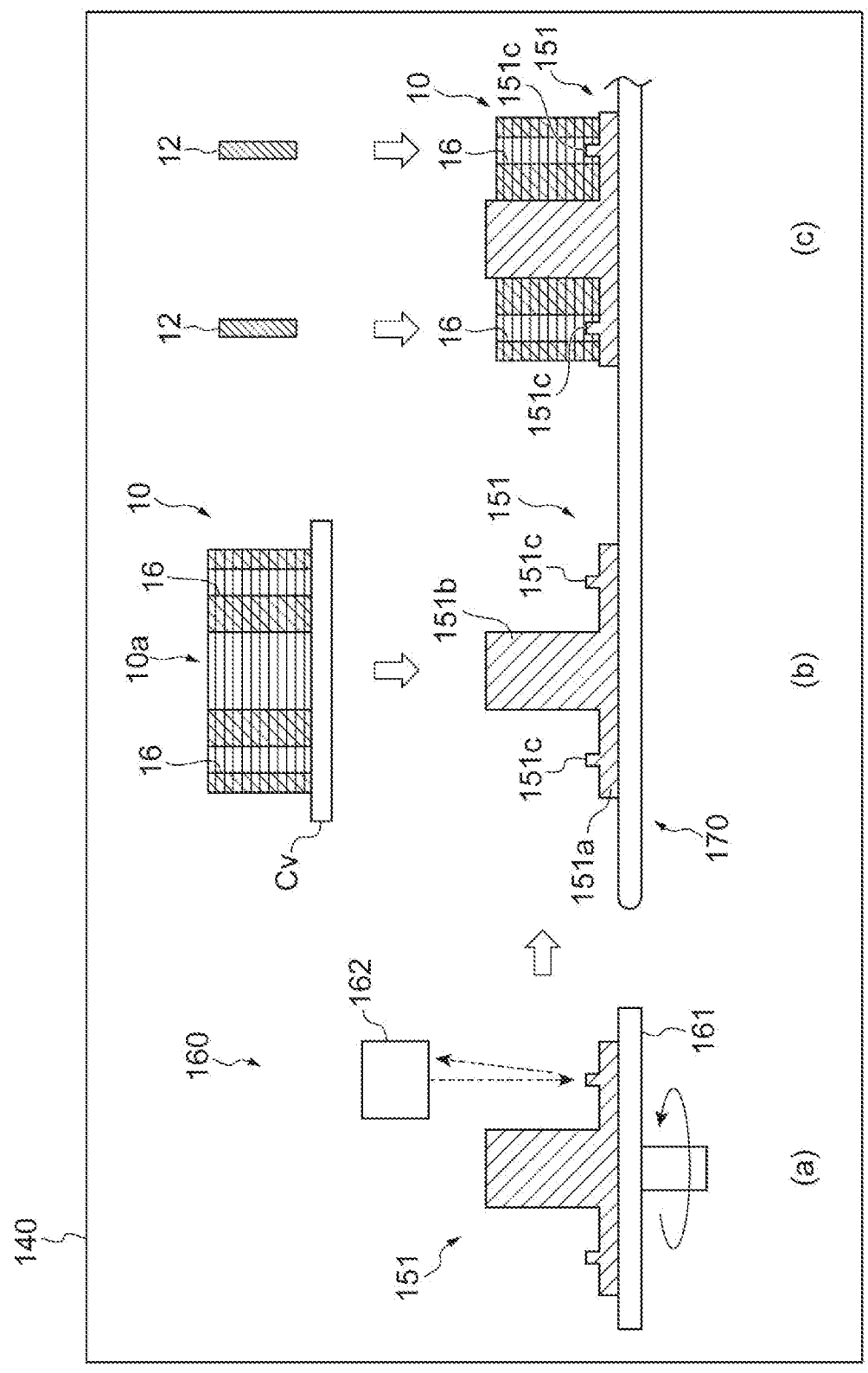
FIG. 5 is a schematic diagram illustrating part of a magnet mounting device.
Figure 6:
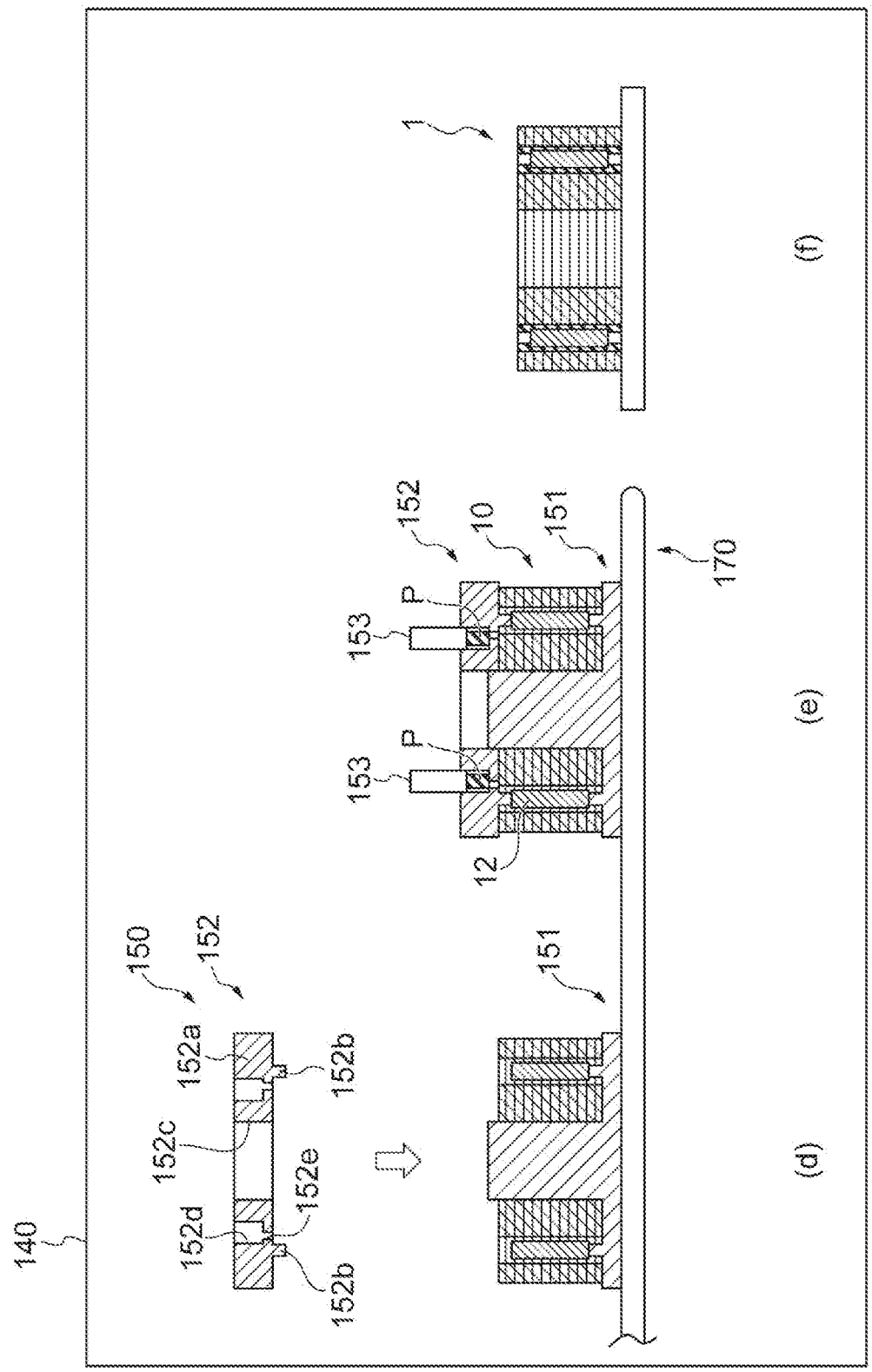
FIG. 6 is a schematic diagram illustrating part of the magnet mounting device.

The following describes details of the magnet mounting device 140 with reference to FIG. 4 to FIG. 6. The magnet mounting device 140 includes a resin charging mechanism 150, a detection mechanism 160, and a conveyance mechanism 170.

As depicted in FIG. 4 in particular, the resin charging mechanism 150 includes a lower die 151, an upper die 152 (holding member), and a plurality of plungers 153. The lower die 151 includes a base member 151a, an insertion post 151b formed on the base member 151a, and a plurality of protrusions (first projecting portions) 151c formed on the base member 151a.

The base member 151a may be a plate-like member having a rectangular shape. The base member 151a is formed so that a stack 10 can be placed thereon. On an upper surface of the base member 151a, an identification code 21 is provided. The configuration of the identification code 21 is similar to that of the identification code 20 provided on the stack 10. For example, the identification code 21 has a function of storing individual information for identifying an individual base member 151a (lower die 151) provided with this identification code 21.

The insertion post 151b is positioned at a substantially central portion of the base member 151a, and protrudes upward from the upper surface of the base member 151a. The insertion post 151b has a columnar shape, having an outer shape corresponding to the shape of the shaft hole 10a of the stack 10.

The protrusions 151c are aligned along the periphery of the insertion post 151b at predetermined intervals. When a stack 10 is placed on the base member 151a, the respective protrusions 151c are located at positions corresponding to the respective magnet insertion holes 16 of the stack 10. The protrusions 151c protrude upward from the upper surface of the base member 151a. Each protrusion 151c has a columnar shape, having a shape corresponding to the shape of the depression 14a of each solidified resin 14.

The upper die 152 is formed so as to be able to hold a stack 10 with the lower die 151 in the height direction. As depicted in FIG. 4 and FIG. 6, the upper die 152 includes a base member 152a, a plurality of protrusions (third projecting portions) 152b formed on the base member 152a, and an internal heat source (e.g., a heater embedded in the base member 152a) (not depicted).

The base member 152a may be a plate-like member having a rectangular shape. On an upper surface of the base member 152a, an identification code 22 is provided. The configuration of the identification code 22 is similar to those of the identification codes 20 and 21 respectively provided on the stack 10 and the lower die 151. For example, the identification code 22 has a function of storing individual information for identifying an individual base member 152a (upper die 152) provided with this identification code 22.

One through hole 152c, a plurality of accommodating depressions 152d, and a plurality of gate holes 152e are formed in the base member 152a. The through hole 152c is positioned at a substantially central portion of the base member 152a. The through hole 152c has a shape (substantially circular shape) corresponding to the shape of the insertion post 151b, and the insertion post 151b can be inserted therein.

The accommodating depressions 152d are aligned, on the upper surface side of the base member 152a, along the periphery of the through hole 152c at predetermined intervals. Thus, openings of the respective accommodating depressions 152d are open to the upper surface side of the base member 152a. When a stack 10 is sandwiched by the lower die 151 and the upper die 152, the respective accommodating depressions 152d are located at positions corresponding to the respective magnet insertion holes 16 of the stack 10. Each accommodating depression 152d has a columnar shape, and has a function of accommodating at least one resin pellet P. When the upper die 152 is heated by the internal heat source of the upper die 152, the resin pellets P accommodated in the respective accommodating depressions 152d are melted to become melted resin.

The gate holes 152e are aligned, on the lower surface side of the base member 152a, along the periphery of the through hole 152c at predetermined intervals. Thus, openings of the respective gate holes 152e are open to the lower surface side of the base member 152a. When a stack 10 is sandwiched by the lower die 151 and the upper die 152, the respective gate holes 152e are located at positions corresponding to the respective magnet insertion holes 16 of the stack 10. The respective gate holes 152e communicate with the corresponding accommodating depressions 152d in the height direction. This enables the melted resin in the accommodating depressions 152d to flow into the gate holes 152e. Thus, the accommodating depressions 152d and the gate holes 152e serve as flow paths for injecting resin into the magnet insertion holes 16.

The protrusions 152b are aligned along the periphery of the through hole 152c at predetermined intervals. When a stack 10 is sandwiched by the lower die 151 and the upper die. 152, the respective protrusions 152b are located at positions corresponding to the respective magnet insertion holes 16 of the stack 10. The protrusions 152b protrude downward from a lower surface of the base member 152a. Each protrusion 152b has a columnar shape, having a shape corresponding to the shape of the depression 14a of each solidified resin 14.

The plungers 153 are positioned above the upper die 152. The respective plungers 153 are configured to be capable of being inserted into and removed from the corresponding accommodating depressions 152d by a drive source (not depicted).

The detection mechanism 160 includes a rotating table 161 and a height detecting unit 162 as depicted in FIG. 5. The rotating table 161 is configured to be capable of being rotated about its rotation axis by a drive source (not depicted). A lower die 151 conveyed by the conveyance mechanism 170 is placed one by one onto the rotating table 161.

The height detecting unit 162 is configured to detect the height of each protrusion 151c of the lower die 151 placed on the rotating table 161. The height detecting unit 162 may be a contact-type sensor, or may be a noncontact-type sensor. The height detecting unit 162 may have a function of directly detecting the height of each protrusion 151c, or may have a function of detecting the height of the protrusion 151c on the basis of the difference between the upper end surface of the protrusion 151c and the upper surface of the base member 151a. When the lower die 151 on the rotating table 161 is rotated together with the rotating table 161, the protrusions 151c can be sequentially detected by this height detecting unit 162 alone.

The conveyance mechanism 170 is positioned downstream of the detection mechanism 160 and the conveyor Cv. Thus, a stack 10 conveyed by the conveyor Cv and a lower die 151 conveyed from the detection mechanism 160 are fed onto a portion of the conveyance mechanism 170 on its upstream side. The conveyance mechanism 170 has a function of intermittently conveying downstream a lower die 151 to which a stack 10 is attached and a function of conveying the lower die 151 so as to return only the lower die 151 to the rotating table 161. In other words, the lower die 151 is conveyed so as to circulate between the detection mechanism 160 (rotating table 161) and the conveyance mechanism 170. Examples of the conveyance mechanism 170 include a conveyor and conveyance rollers.

Method for Manufacturing Stacked Rotor Core

An example method for manufacturing a stacked rotor core 1 is described with reference to FIG. 5 to FIG. 7. Herein, description of a process of forming a stack 10 by the blanking device 130 is omitted, and the subsequent processes will be described.

To begin with, a lower die 151 that has been previously used to produce a stacked rotor core 1 is conveyed by the conveyance mechanism 170 to the rotating table 161, and is placed onto the rotating table 161. Placement of the lower die 151 onto the rotating table 161 may be performed manually, or may be performed by a transfer device (e.g., a robot hand, not depicted) in response to instructions of the controller Ctr. In this state, the controller Ctr issues instructions to the rotating table 161 and the height detecting unit 162 to cause the height detecting unit 162 to sequentially measure the heights of the protrusions 151c formed on the lower die 151 that is being rotated by the rotating table 161 (see section (a) in FIG. 5 and step S10 in FIG. 7).

Although not depicted in FIG. 5, the heights of the protrusions 152b of an upper die 152 are also measured by the height detecting unit 162 in a manner similar to that for the protrusions 151c of the lower die 151. In other words, the heights of the protrusions 152b formed on the upper die 152 that is placed on the rotating table 161 and is being rotated are sequentially measured by the height detecting unit 162 (see step S10 in FIG. 7).

Figure 7:
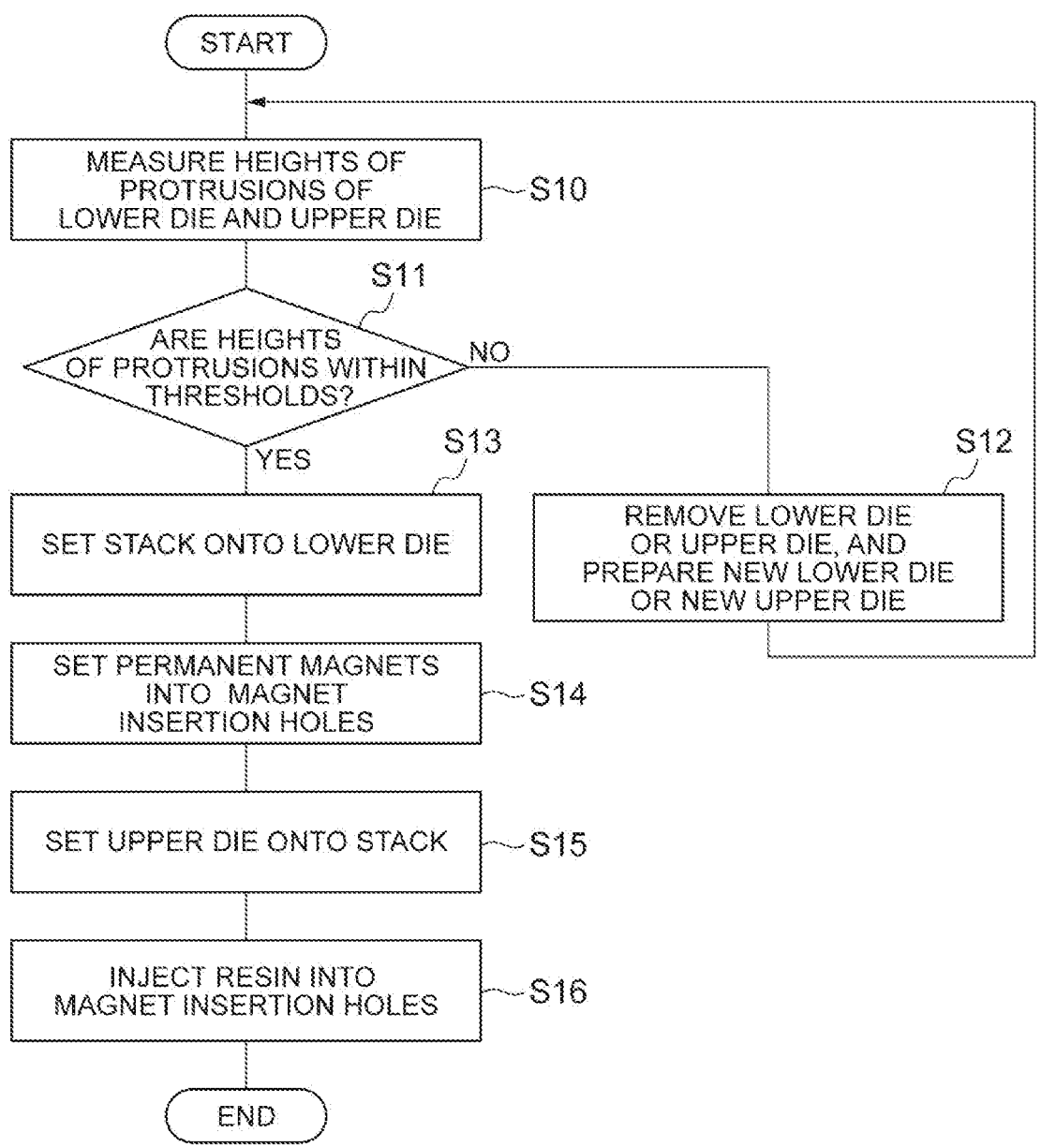
FIG. 7 is a flowchart illustrating an example method for manufacturing a stacked rotor core.

When receiving data of the heights of the respective protrusions 151c and 152b detected by the height detecting unit 162, the controller Ctr determines whether the heights of the respective protrusions 151c and 152b are within thresholds (within setting ranges, see step S11 in FIG. 7). As a result of the determination of the controller Ctr at step S11, if even one of the heights of the respective protrusions 151c and 152b is out of the thresholds (see NO at step S11 in FIG. 7), a lower die 151 or an upper die 152 having a protrusion 151c or 152b that is out of the threshold is removed from the magnet mounting device 140, and a new lower die 151 or a new upper die 152 is prepared (see step S12 in FIG. 7).

As a result of the determination of the controller Ctr at step S11, if all the protrusions 151c and 152b are within the thresholds (see YES at step S11 in FIG. 7), the lower die 151 is conveyed to the conveyance mechanism 170, and is placed onto the conveyance mechanism 170 (see section (b) in FIG. 5). Subsequently, a stack 10 conveyed by the conveyor Cv from the blanking device 130 is attached to the lower die 151 placed on the conveyance mechanism 170 (see section (b) in FIG. 5 and step S13 in FIG. 7). For example, the stack 10 is placed onto the lower die 151 (base member 151a) such that the insertion post 151b is inserted into the shaft hole 10a of the stack 10 and the respective protrusions 151c are positioned in the corresponding magnet insertion holes 16. Placement of the lower die 151 onto the conveyance mechanism 170 and placement of the stack 10 onto the lower die 151 may be performed manually, or may be performed by a transfer device (e.g., a robot hand, not depicted) in response to instructions of the controller Ctr.

Subsequently, after the conveyance mechanism 170 intermittently conveys the lower die 151 downstream in response to instructions of the controller Ctr, permanent magnets 12 are inserted into the respective magnet insertion holes 16 of the stack 10 one by one (see section (c) in FIG. 5 and step S14 in FIG. 7). At this time, lower end surfaces of the permanent magnets 12 inserted into the magnet insertion holes 16 come into contact with the upper ends of the protrusions 151c, respectively. Insertion of the permanent magnets 12 into the respective magnet insertion holes 16 may be performed manually, or may be performed by an inserting device (e.g., a robot hand, not depicted) in response to instructions of the controller Ctr.

Subsequently, after the conveyance mechanism 170 intermittently conveys the lower die 151 downstream in response to instructions of the controller Ctr, and after having been determined that the heights of all the protrusions 152b of the upper die 152 are within the threshold at step S11, an upper die 152 is attached to the stack 10 (see section (d) in FIG. 6 and step S15 in FIG. 7). At this time, the upper die 152 is placed onto the stack 10 such that the insertion post 151b is inserted into the through hole 152c and the respective protrusions 152b are positioned in the corresponding magnet insertion holes 16. Thus, the stack 10 is sandwiched by the lower die 151 and the upper die 152 in the height direction. The lower ends of the protrusions 152b inserted into the magnet insertion holes 16 come into contact with the upper end surfaces of the permanent magnets 12, respectively, and thus the permanent magnets 12 are sandwiched by the protrusions 151c and 152b in the height direction. In this state, the accommodating depressions 152d and the gate holes 152e that are flow paths for injecting resin communicate with the corresponding magnet insertion holes 16.

Subsequently, resin pellets P are charged into the respective accommodating depressions 152d. When the resin pellets P have been melted by the internal heat source of the upper die 152, this melted resin is injected by the plungers 153 into the respective magnet insertion holes 16 (see section (e) in FIG. 6 and step S16 in FIG. 7). Subsequently, the melted resin is cooled to be solidified, whereby solidified resins 14 are formed in the magnet insertion holes 16. When the lower die 151 and the upper die 152 have been removed from the stack 10, a stacked rotor core 1 is completed (see section (f) in FIG. 6).

In Japanese Unexamined Patent Publication No. 2015-192573, for the manufactured rotor core, whether the permanent magnets are located at target positions of the magnet insertion holes is not inspected.

On the other hand, example processes disclosed herein may be used to improve the positioning accuracy of the permanent magnets in the magnet insertion holes. In some examples, the processes may be performed before a stack 10 is placed onto a lower die 151, the heights of the protrusions 151c formed on the lower die 151 are detected by the height detecting unit 162, and if the heights of all the protrusions 151c are within a threshold. Thus, with the permanent magnets 12 being in contact with the protrusions 151c, melted resin is injected into the magnet insertion holes 16 to be solidified therein, such that it may be detected in advance that the positions of the permanent magnets 12 in the magnet insertion holes 16 are reliably located at height positions of the protrusions 151c. Consequently, by detecting the heights of the protrusions 151c in advance, positioning accuracy of the permanent magnets 12 in the magnet insertion holes 16 can be reliably obtained.

In some examples, before an upper die 152 is placed onto a stack 10, the heights of the protrusions 152b formed on the upper die 152 are detected by the height detecting unit 162, and if the heights of all the protrusions 152b are within the threshold, the subsequent processes are performed. Thus, when melted resin is injected into the magnet insertion holes 16, the permanent magnets 12 are sandwiched by the protrusions 151c of the lower die 151 and the protrusions 152b of the upper die 152. Thus, movement of the permanent magnets 12 in the height direction (stacking direction) is restricted by the protrusions 151c and 152b. Consequently, the permanent magnets 12 can be reliably positioned in the magnet insertion holes 16 more accurately.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

Embodiment (1)

Figure 8A:
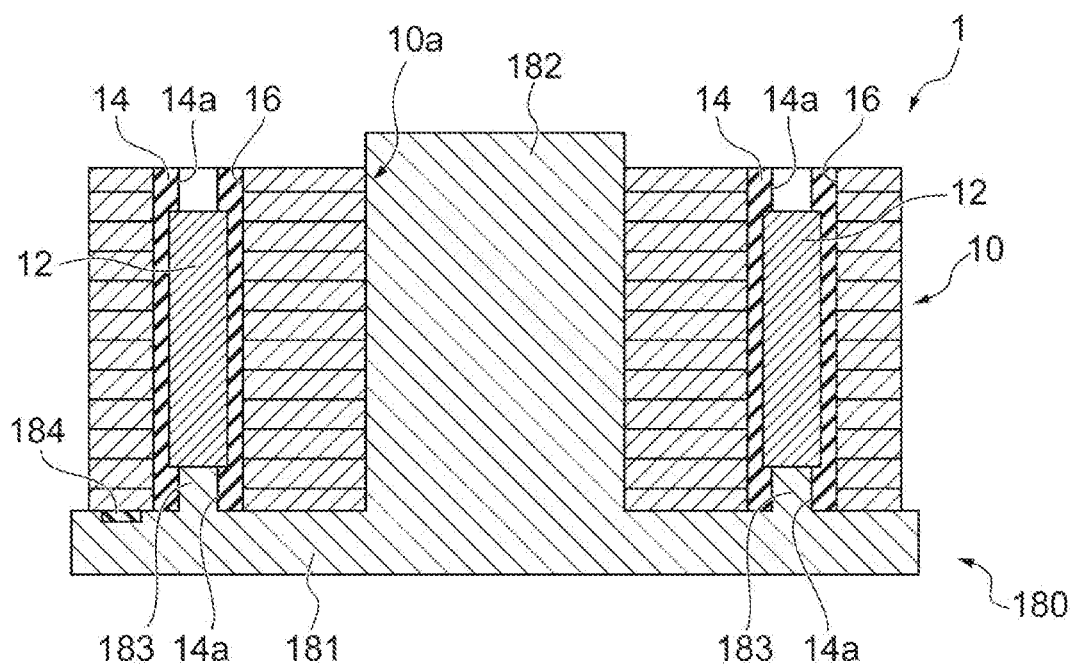
FIG. 8A and FIG. 8B are schematic diagrams illustrating an example position measurement of permanent magnets.
Figure 8B:
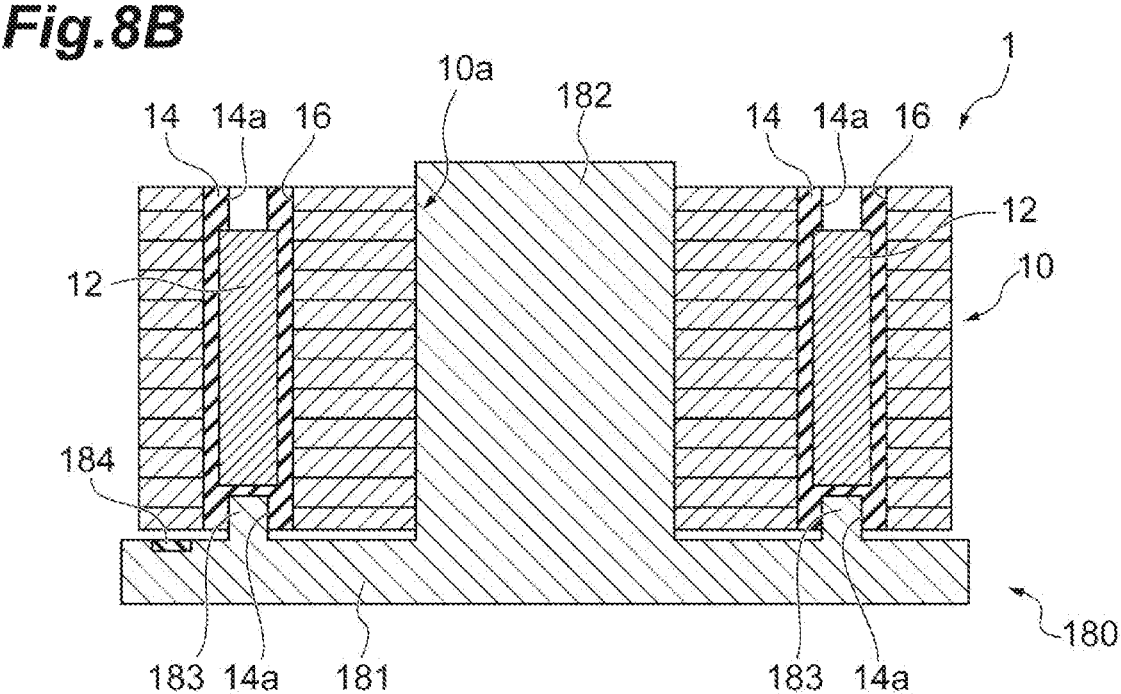

For example, the magnet mounting device 140 may include a reading device (not depicted) for the identification codes 20 to 22 and a depth detecting unit 180 instead of the detection mechanism 160. The depth detecting unit 180 may be configured to detect whether the depths of the depressions 14a of a produced stacked rotor core 1 are within a threshold. For example, as depicted in FIGS. 8A and 8B, the depth detecting unit 180 includes a base member 181, an insertion post 182 formed on the base member 181, a plurality of protrusions (fourth projecting portions) 183 formed on the base member 181, and a contact sensor 184 formed on the base member 181.

The base member 181 may be a plate-like member having a rectangular shape. The base member 181 is configured so that a stacked rotor core 1 can be placed thereon. The insertion post 182 is positioned at a substantially central portion of the base member 181, and protrudes upward from the upper surface of the base member 181. The insertion post 182 has a columnar shape, having an outer shape corresponding to the shape of the shaft hole 10a of the stacked rotor core 1 (stack 10).

The protrusions 183 are aligned along the periphery of the insertion post 182 at predetermined intervals. When a stacked rotor core 1 is placed on the base member 181, the respective protrusions 183 are located at positions corresponding to the respective depressions 14a of the solidified resins 14 of the stacked rotor core 1. The protrusions 183 protrude upward from the upper surface of the base member 181. Each protrusion 183 has a columnar shape, corresponding to the shape of depression 14a of each solidified resin 14. The height of each protrusion 183 is set equal to the height of each protrusion 151c of a lower die 151.

With the stacked rotor core 1 being attached to the depth detecting unit 180, that is, when the insertion post 182 has been inserted into the shaft hole 10a and the respective protrusions 183 are positioned in the corresponding depressions 14a, the contact sensor 184 detects whether the contact sensor 184 itself is in contact with the stack 10. In this specification, the contact sensor 184 may determine that the stack 10 is in "contact" when the stack 10 is in direct contact with the contact sensor 184 (when a gap between the contact sensor 184 and the stack 10 is zero), or may determine that stack 10 is in "contact" when the stack is sufficiently close to the contact sensor (when the gap is within a threshold).

Figure 9:
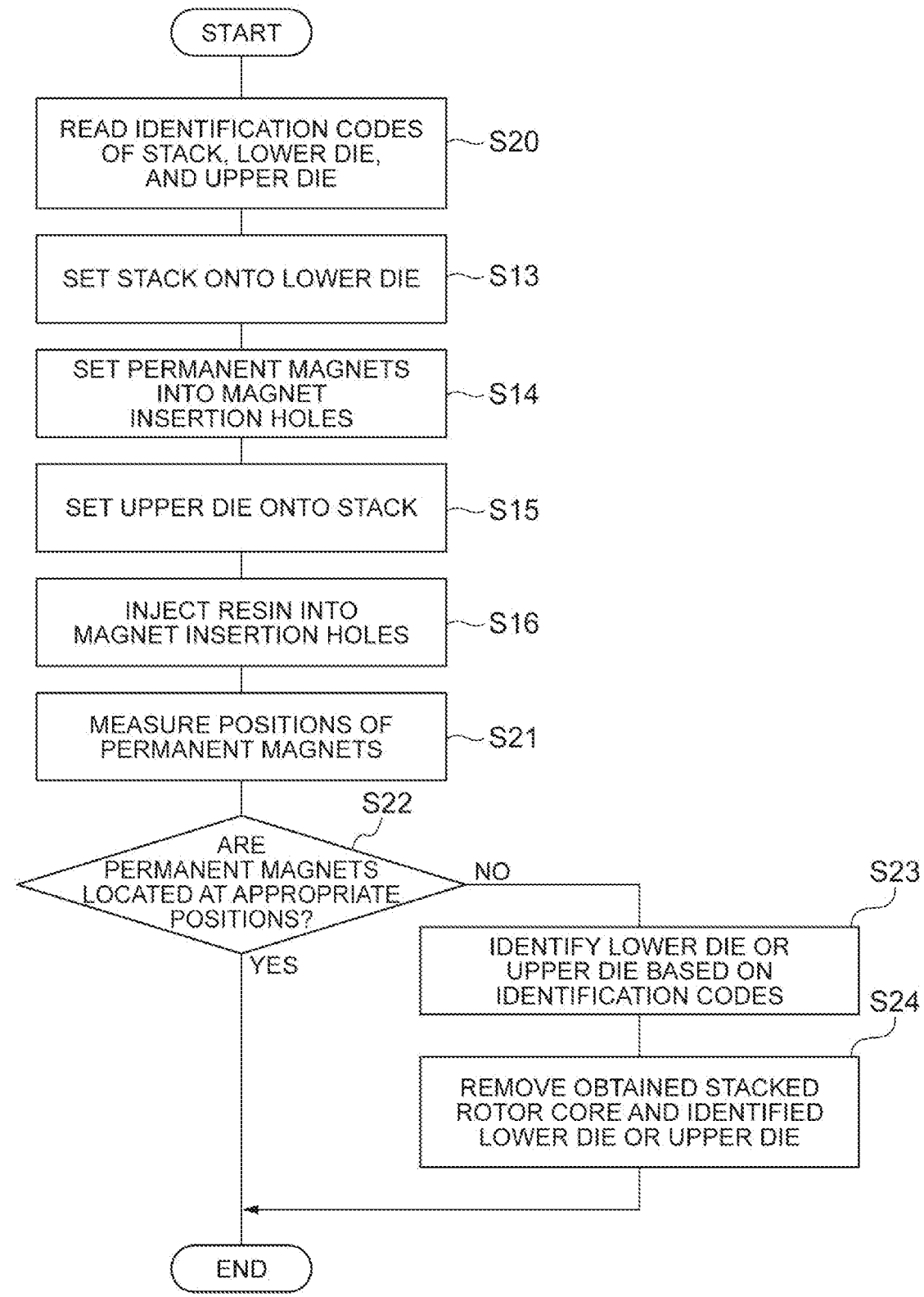
FIG. 9 is a flowchart illustrating another example method for manufacturing a stacked rotor core.

An example method for manufacturing a stacked rotor core 1 using the above-described reading device and the depth detecting unit 180 is described with reference to FIGS. 8A and 8B and FIG. 9. To begin with, in response to instruction signals from the controller Ctr, the reading device reads the identification code 20 of a stack 10 and the respective identification codes 21 and 22 of a lower die 151 and an upper die 152 to be attached to this stack 10 (see step S20 in FIG. 9). Based on the identification codes 20 to 22, the controller Ctr stores, in a recording medium, information that associates the stack 10 with the lower die 151 and the upper die 152 to be attached to the stack 10.

Subsequently, the respective processes at steps S13 to S16 already described are performed, whereby a stacked rotor core 1 is manufactured. Subsequently, the stacked rotor core 1 is attached to the depth detecting unit 180. For example, the stacked rotor core 1 is placed onto the base member 181 such that the insertion post 182 has been inserted into the shaft hole 10a and the respective protrusions 183 are positioned in the corresponding depressions 14a. Subsequently, by the depth detecting unit 180, the depths of the respective depressions 14a of the stacked rotor core 1 are measured (see step S21 in FIG. 9). For example, it is determined whether the contact sensor 184 is in contact with the stack 10.

In response to receiving a signal indicating a contact state from the contact sensor 184 (see FIG. 8A and YES at step S22 in FIG. 9), the controller Ctr determines that the positions of the permanent magnets 12 in the magnet insertion hole 16 are located at height positions of the protrusions 151c. Thus, manufacturing of the stacked rotor core 1 is completed.

On the other hand, in response to receiving a signal indicating a noncontact state from the contact sensor 184 (see FIG. 8B and NO at step S22 in FIG. 9), the controller Ctr determines that the positions of the permanent magnets 12 in the magnet insertion hole 16 are not located at the height positions of the protrusions 151c. In this case, the depths of the depressions 14a have become shallower, whereby the stacked rotor core 1 attached to the depth detecting unit 180 is suspended apart from the base member 181. Such shallower depths are caused by wear of the protrusions 151c of the lower die 151, or caused by presence of melted resin that has entered between each protrusion 151c and the corresponding permanent magnet 12 (see FIG. 8B) due to extraneous substances or the like adhering to the lower die 151 when the melted resin has been injected into the magnet insertion holes 16 at step S16, for example.

In the noncontact state, based on instruction signals from the controller Ctr, the reading device reads the identification code 20 of the stacked rotor core 1 again. The controller Ctr identifies a lower die 151 used for manufacturing this stacked rotor core 1 on the basis of the identification code 21 associated with the read identification code 20 (see step S23 in FIG. 9). Subsequently, this stacked rotor core 1 and the identified lower die 151 are removed from the magnet mounting device 140 (see step S24 in FIG. 9).

The respective processes at steps S21 to S24 described above may be performed on an upper die 152. In other words, a stacked rotor core 1 turned upside down may be attached to the depth detecting unit 180, and the protrusions 183 may be positioned in the respective depressions 14a formed by the protrusions 152b of the upper die 152.

According to the modified embodiment (1) above, the depth detecting unit 180 detects the depths of depressions 14a after manufacturing of a stacked rotor core 1. Thus, the actual positions of the permanent magnets 12 in the magnet insertion holes 16 can be determined. Consequently, by detecting the depths of the depressions 14a after manufacturing of the stacked rotor core 1, the permanent magnets 12 can be reliably positioned in the magnet insertion holes 16 more accurately.

According to the modified embodiment (1) above, by setting the heights of the protrusions 183 to be equal to the heights of protrusions 151c that are not yet worn, positioning accuracy of the permanent magnets 12 in the magnet insertion holes 16 can be reliably obtained on the basis of ON/OFF conditions of the contact sensor 184.

Embodiment (2)

Figure 10A:
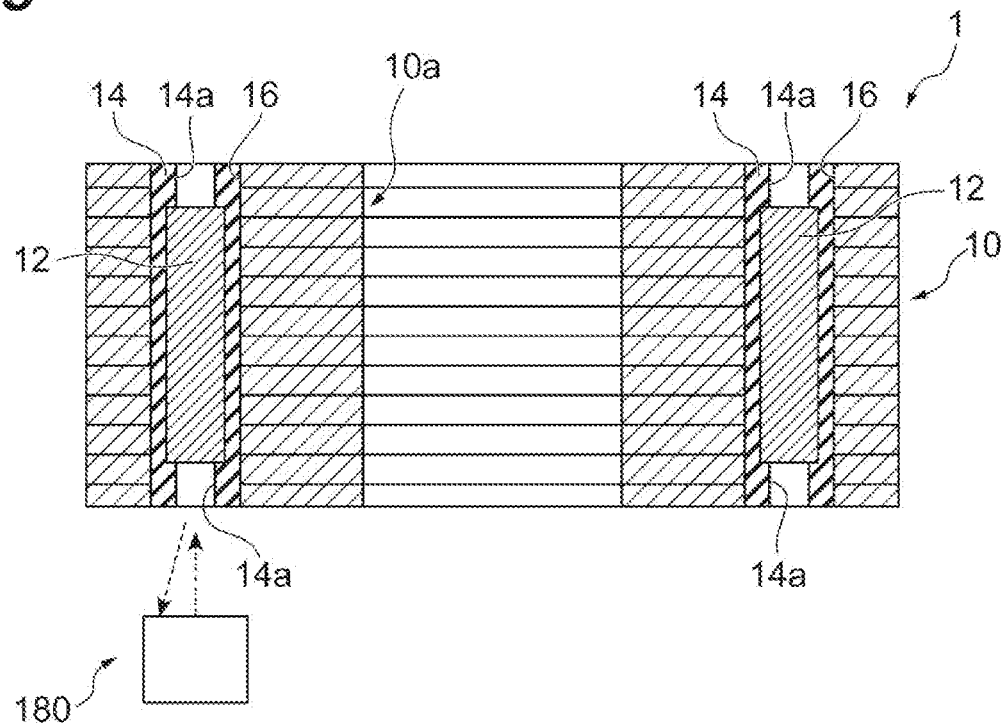
FIG. 10A and FIG. 10B are schematic diagrams illustrating another example position measurement of permanent magnets.
Figure 10B:
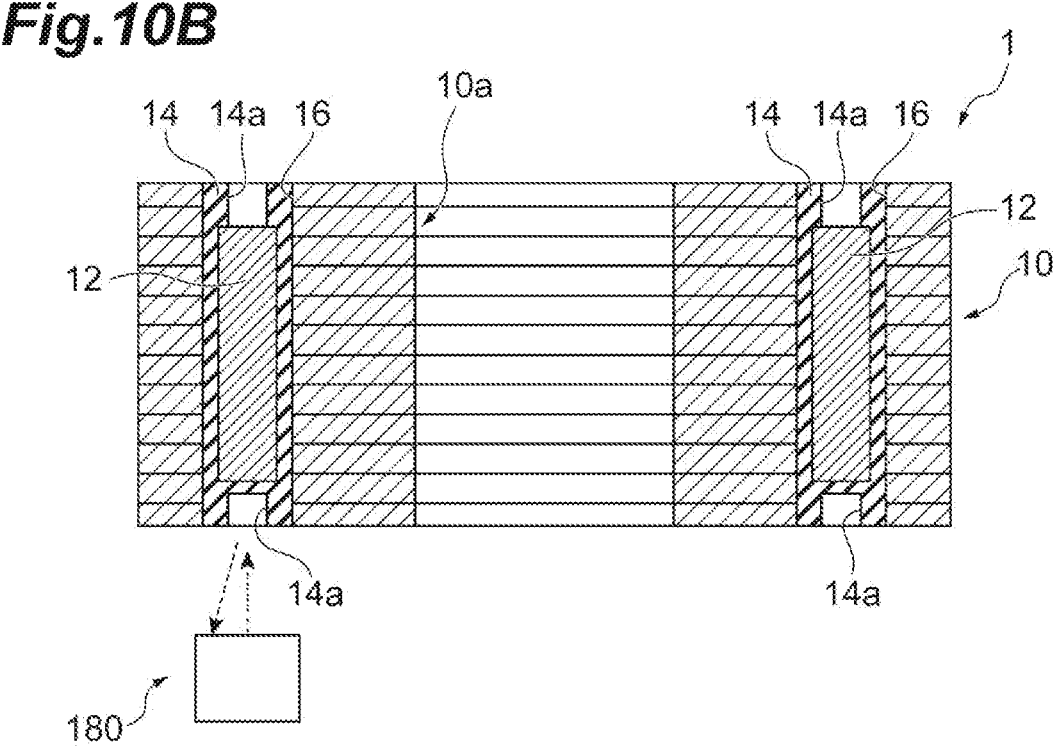

The depth detecting unit 180 in the modified embodiment (1) above may be a contact-type or noncontact-type depth sensor as depicted in FIGS. 10A and 10B. If the depths of depressions 14a detected by the depth detecting unit 180 are within a set range (see FIG. 10A), the controller Ctr determines that the positions of the permanent magnets 12 in the magnet insertion holes 16 are located at height positions of the protrusions 151c. If the depths of depressions 14a detected by the depth detecting unit 180 are out of the set range (see FIG. 10B), the controller Ctr determines that the positions of the permanent magnets 12 in the magnet insertion holes 16 are not located at the height positions of the protrusions 151c. According to the modified embodiment (2), by using a commercially available contact-type or noncontact-type depth sensor, positioning accuracy of the permanent magnets 12 in the magnet insertion holes 16 can be reliably obtained.

Embodiment (3)

The modified embodiment (1) or (2) may be combined with other examples disclosed herein. For example, before manufacturing a stacked rotor core 1, the respective protrusions 151c and 152b of the lower die 151 and the upper die 152 may be detected by the height detecting unit 162, and after manufacturing the stacked rotor core 1, the depths of the depressions 14a may be detected by the depth detecting unit 180.

Embodiment (4)

Figure 11A:
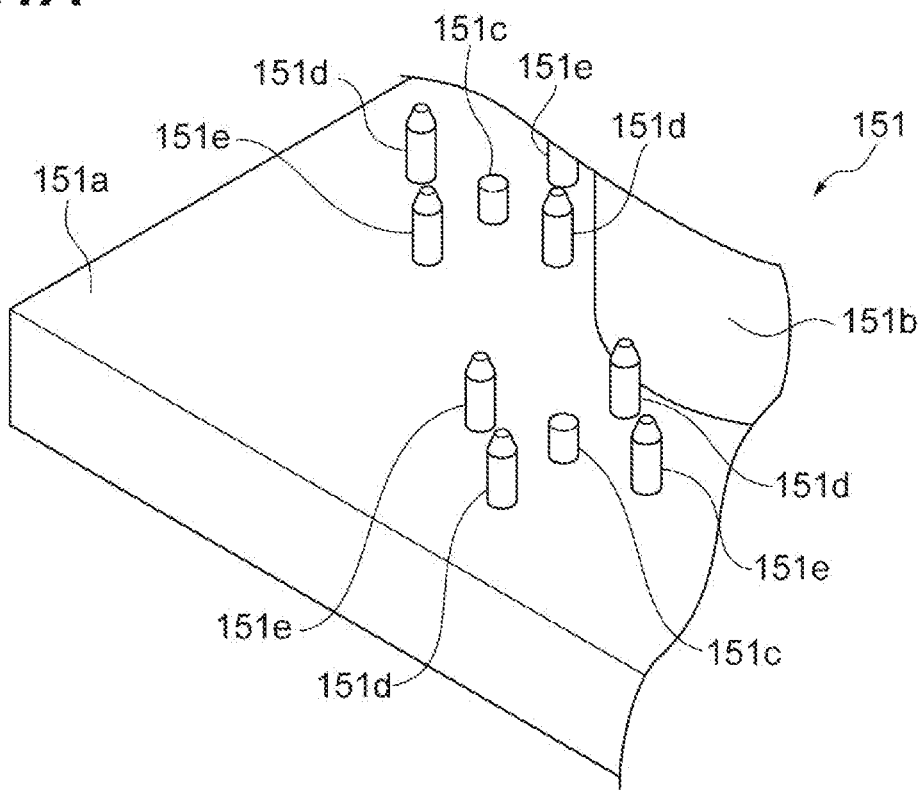
FIG. 11A and FIG. 11B are perspective views illustrating other examples of a lower die.

As depicted in FIG. 11A, the lower die 151 may further include pairs of protrusions 151d (second projecting portions) and pairs of protrusions 151e (second projecting portions) in addition to the protrusions 151c. The protrusions 151d and 151e protrude upward from the upper surface of the base member 151a. The protrusions 151d and 151e each have a columnar shape. As depicted in FIG. 11A, distal end portions of the protrusions 151d and 151e may be reduced in diameter toward the distal ends.

Each pair of protrusions 151d is positioned with a corresponding protrusion 151c interposed therebetween. The corresponding pair of protrusions 151e is positioned with the same protrusion 151c interposed therebetween. In other words, this one protrusion 151c is positioned at a central portion of these protrusions 151d and 151e. When a stack 10 is placed onto the base member 151a, the pair of protrusions 151d and the pair of protrusions 151e are positioned in a corresponding magnet insertion hole 16 together with the one protrusion 151c surrounded by these protrusions 151d and 151e.

The opposing direction of the pair of protrusions 151d and the opposing direction of the pair of protrusions 151e intersect each other. The separation distance between the pair of protrusions 151d is substantially the same as the width of each permanent magnet 12 in the lateral direction. The separation distance between the pair of protrusions 151e is substantially the same as the width of the permanent magnet 12 in the longitudinal direction. Thus, when each permanent magnet 12 is inserted into the corresponding magnet insertion hole 16 at step S14, the lower end surface of the permanent magnet 12 comes into contact with the upper end surface of the corresponding protrusion 151c, and the periphery of the lower end portion of the permanent magnet 12 is surrounded by the corresponding protrusions 151d and 151e.

According to the modified embodiment (4), the lower end portion of each permanent magnet 12 is sandwiched by a pair of protrusions 151d and a pair of protrusions 151e. Thus, movement of the permanent magnet 12 is restricted in the opposing direction of the pair of protrusions 151d and the opposing direction of the pair of protrusions 151e. Consequently, the permanent magnet 12 can be positioned not only in the height direction, but also in the horizontal direction. Furthermore, because the distal end portions of the protrusions 151d and 151e are reduced in diameter toward the distal ends, the lower end portion of the permanent magnet 12 can be easily guided to the inside between the protrusions 151d and 151e. Herein, the lower die 151 may include at least one pair of protrusions 151d and at least one pair of protrusions 151e. The upper die 152 also may include protrusions corresponding to the protrusions 151d and 151e.

Embodiment (5)

Figure 11B:
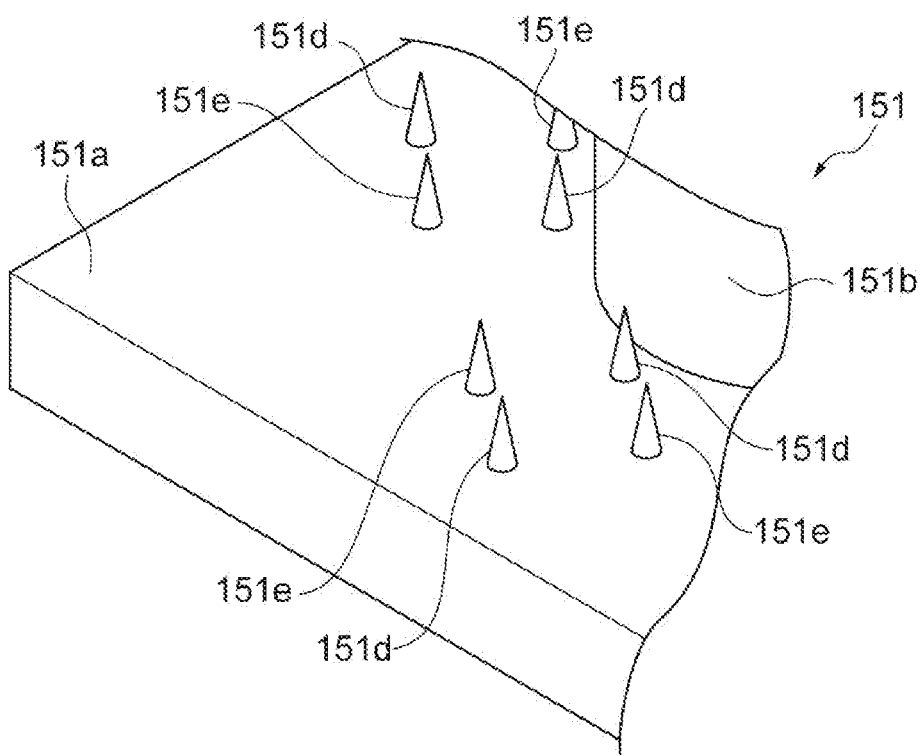

As depicted in FIG. 11B, the lower die 151 may further include pairs of protrusions 151d (second projecting portions) and pairs of protrusions 151e (second projecting portions) instead of the protrusions 151c. In the form depicted in FIG. 11B, these protrusions 151d and 151e each have a conical shape. Thus, an area surrounded by each pair of protrusions 151d and the corresponding pair of protrusions 151e becomes smaller toward the base member 151a. Thus, even without the protrusions 151c, the lower end periphery of each permanent magnet 12 engages with peripheral surfaces of the corresponding pairs of protrusion 151d and 151e, whereby the permanent magnet 12 is held above the base member 151a. In this modified embodiment (5) also, functional effects similar to those of the modified embodiment (4) can be obtained. Herein, the lower die 151 may include at least one pair of protrusions 151d and at least one pair of protrusions 151e. The upper die 152 also may include protrusions corresponding to the protrusions 151d and 151e. Even in the modified embodiment (5), the lower die 151 may include the protrusions 151c.

Embodiment (6)

At least the lower die 151 may include the protrusions 151c. In other words, the upper die 152 may not include the protrusions 152b. In this case, in a manufactured stacked rotor core 1, no depression 14a is formed on the upper end side of each permanent magnet 12, and the corresponding solidified resin 14 covers this upper end portion of the permanent magnet 12.

Embodiment (7)

The lower die 151 may include projecting portions having forms other than that of the columnar protrusions 151c. For example, the lower die 151 may include projecting portions protruding from a surface of the base member 151a, and each projecting portion may have a groove corresponding to a corner of the corresponding permanent magnet 12.

Embodiment (8)

In one or more examples described herein, after a stack 10 is attached to a lower die 151, permanent magnets 12 are inserted into the respective magnet insertion holes 16. However, a stack 10 in the state where the permanent magnets 12 have been inserted into the respective magnet insertion holes 16 may be attached to the lower die 151.

Embodiment (9)

One set of magnets consisting of two or more permanent magnets 12 in combination may each be inserted into each magnet insertion hole 16. In this case, in each magnet insertion hole 16, a plurality of permanent magnets 12 may be aligned in the longitudinal direction of the magnet insertion hole 16. In each magnet insertion hole 16, a plurality of permanent magnets 12 may be aligned in the lengthwise direction of the magnet insertion hole 16. In each magnet insertion hole 16, a plurality of permanent magnets 12 may be aligned in the longitudinal direction, and simultaneously a plurality of permanent magnets 12 may be aligned in the lengthwise direction.

Embodiment (10)

In one or more examples described herein, a stack 10 formed by stacking a plurality of blanked members W serves as a core body to which permanent magnets 12 are attached. However, the core body may be formed of components other than the stack 10. For example, the core body may be formed by compression molding ferromagnetic powder, or may be formed by injection molding resin material containing ferromagnetic powder.

Embodiment (11)

In one or more examples described herein, melted resin is injected into magnet insertion holes 16 from the upper die 152 side. However, the melted resin may be injected into the magnet insertion holes 16 from the lower die 151 side. Alternatively, the melted resin may be injected into the magnet insertion holes 16 from both of the lower die 151 side and the upper die 152 side.

Embodiment (12)

Between the lower die 151 and the stack 10, a cull plate may be disposed. Similarly, between the upper die 152 and the stack 10, a cull plate may be disposed. In this case, a resin flow path (e.g., a runner, a gate hole) for guiding melted resin to each magnet insertion hole 16 is formed in the cull plate. When the stack 10 and the upper die 152 are in direct contact with each other and the melted resin is injected into the magnet insertion hole 16 from the upper die 152 side, the resin flow path may be formed on an opposing surface of the upper die 152 opposed to the stack 10. Similarly, when the stack 10 and the lower die 151 are in direct contact with each other and the melted resin is injected into the magnet insertion hole 16 from the lower die 151 side, the resin flow path may be formed on an opposing surface of the lower die 151 opposed to the stack 10.

ADDITIONAL EXAMPLES

Example 1

A method for manufacturing a rotor core according to one example of the present disclosure includes detecting a height of a first projecting portion formed on a lower die by a height detecting unit, and placing onto the lower die a core body in which a magnet insertion hole passing through the core body in a height direction thereof is formed such that the first projecting portion is positioned in the magnet insertion hole when the height detecting unit has determined that the height of the first projecting portion is within a set range. Additionally, the method may comprise bringing a permanent magnet in the magnet insertion hole into contact with an upper end of the first projecting portion, and placing onto the core body a holding member configured to hold the core body with the lower die after bringing the permanent magnet into contact with the upper end of the first projecting portion. Melted resin is injected into the magnet insertion hole in which the permanent magnet has been inserted after placing the holding member onto the core body.

In some examples, a lower die used when one rotor core is manufactured is also used for manufacturing another rotor core. However, repeated use of a lower die in manufacturing of a rotor core gradually wears a first projecting portion formed on the lower die, or damages the first projecting portion due to its small size. Such small wear or damage, even though it is hard to be found by a visual check, will change the position of a permanent magnet in a magnet insertion hole.

In the method according to Example 1, before the core body is placed onto the lower die, the height of the first projecting portion formed on the lower die is detected by the height detecting unit, and the subsequent processes are performed when the height of the first projecting portion is within the set range. Thus, with the permanent magnet being in contact with the first projecting portion, the melted resin is injected into the magnet insertion hole to be solidified therein, whereby the position of the permanent magnet in the magnet insertion hole is reliably located at a height position of the first projecting portion detected in advance. Consequently, only through a process of detecting the height of the first projecting portion in advance, positioning accuracy of the permanent magnet in the magnet insertion hole can be reliably obtained.

Example 2

With reference to the method according to Example 1, a pair of second projecting portions may be formed on the lower die, and placing the core body onto the lower die may include placing the core body onto the lower die such that the first projecting portion and the pair of second projecting portions are positioned in the magnet insertion hole. Additionally, inserting the permanent magnet into the magnet insertion hole may include inserting the permanent magnet into the magnet insertion hole such that the permanent magnet comes into contact with the upper end of the first projecting portion and the permanent magnet is sandwiched by the pair of second projecting portions. In this case, the permanent magnet is sandwiched by the pair of second projecting portions, whereby movement of permanent magnet in the opposing direction of the pair of second projecting portions is restricted. Thus, the permanent magnet can be positioned not only in the height direction, but also in the horizontal direction.

Example 3

With reference to the method according to Example 1 or 2, a third projecting portion may be formed on the holding member, and placing the holding member onto the core body may include bringing the permanent magnet in the magnet insertion hole into contact with a lower end of the third projecting portion. In this case, when the melted resin is injected into the magnet insertion hole, the permanent magnet is sandwiched by the first projecting portion of the lower die and the third projecting portion of the holding member. Thus, movement of the permanent magnet in the height direction is restricted by the first and third projecting portions. Consequently, the position of the permanent magnet in the magnet insertion hole can be determined accurately.

Example 4

With reference to the method according to any one of Examples 1 to 3, the method may further include removing the lower die and the holding member from the core body after injecting the melted resin into the magnet insertion hole to form a depression on a lower end portion of a solidified resin formed by solidifying the melted resin, the lower end portion corresponding to the first projecting portion, and detecting a depth of the depression by a depth detecting unit. In this case, after manufacturing the rotor core, the depth detecting unit detects the depth of the depression. Thus, the actual position of the permanent magnet in the magnet insertion hole can be determined. Consequently, through a process of detecting the depth of the depression after manufacturing of the rotor core, the position of the permanent magnet in the magnet insertion hole can be determined accurately.

Example 5

With reference to the method according to Example 4, the depth detecting unit may include a base member, a fourth projecting portion formed on the base member, and a contact sensor formed on the base member. Additionally, detecting the depth of the depression by the depth detecting unit may include detecting by the contact sensor whether the core body is in contact with the contact sensor when the fourth projecting portion is positioned in the depression. In this case, by setting the height of the fourth projecting portion to be equal to the height of the first projecting portion, the positioning accuracy of the permanent magnet in the magnet insertion hole can be reliably obtained on the basis of ON/OFF conditions of the contact sensor.

Example 6

With reference to the method according to Example 4, the depth detecting unit may be a depth sensor configured to be capable of directly measuring the depth of the depression. In this case, by using a commercially available contact-type or noncontact-type depth sensor, the positioning accuracy of the permanent magnet in the magnet insertion hole can be reliably obtained.

Example 7

A method for manufacturing a metal product according to another example of the present disclosure includes placing onto a lower die a core body in which a magnet insertion hole passing through the core body in a height direction thereof is formed such that a first projecting portion formed on the lower die is positioned in the magnet insertion hole, and bringing a permanent magnet in the magnet insertion hole into contact with an upper end of the first projecting portion. Additionally, the method may comprise placing onto the core body a holding member configured to hold the core body with the lower die after bringing the permanent magnet into contact with the upper end of the first projecting portion, and injecting melted resin into the magnet insertion hole in which the permanent magnet has been inserted after placing the holding member onto the core body. Still further, the method may comprise removing the lower die and the holding member from the core body after injecting the melted resin into the magnet insertion hole to form a depression on a lower end portion of a solidified resin formed by solidifying the melted resin, the lower end portion corresponding to the first projecting portion, and detecting whether a depth of the depression is within a set range by a depth detecting unit.

In some examples, a lower die used when one rotor core is manufactured is also used for manufacturing another rotor core. However, the repeated use of a lower die in manufacturing of a rotor core gradually wears a first projecting portion formed on the lower die. Such small wear, even though it is hard to be found by a visual check, will change the position of a permanent magnet in a magnet insertion hole.

In the method according to Example 7, the depth detecting unit detects the depth of the depression after manufacturing of the rotor core. Thus, the actual position of the permanent magnet in the magnet insertion hole can be determined. Consequently, through a process of detecting the depth of the depression after manufacturing of the rotor core, positioning accuracy of the permanent magnet in the magnet insertion hole can be reliably obtained.

Example 8

With reference to the method according to Example 7, a pair of second projecting portions may be formed on the lower die, and placing the core body onto the lower die may include placing the core body onto the lower die such that the first projecting portion and the pair of second projecting portions are positioned in the magnet insertion hole. Additionally, inserting the permanent magnet into the magnet insertion hole may include inserting the permanent magnet into the magnet insertion hole such that the permanent magnet comes into contact with the upper end of the first projecting portion and the permanent magnet is sandwiched by the pair of second projecting portions to obtain the same or similar functionality as those of the method according to Example 2.

Example 9

With reference to the method according to Examples 7 or 8, a third projecting portion may be formed on the holding member, and placing the holding member onto the core body may include bringing the permanent magnet in the magnet insertion hole into contact with a lower end of the third projecting portion to obtain the same or similar functionality as those of the method according to Example 3.

Example 10

With reference to the method according to any one of Examples 7 to 9, the depth detecting unit may include a base member, a fourth projecting portion formed on the base member, and a contact sensor formed on the base member. Additionally, detecting whether the depth of the depression is within the set range by the depth detecting unit may include detecting by the contact sensor whether the core body is in contact with the contact sensor when the fourth projecting portion is positioned in the depression to obtain the same or similar functionality as those of the method according to Example 5.

Example 11

With reference to the method according to any one of Examples 7 to 9, the depth detecting unit may be a depth sensor configured to be capable of directly measuring the depth of the depression to obtain the same or similar functionality as those of the method according to Example 6.

We claim all modifications and variations coming within the spirit and scope of the subject matter claimed herein.

The invention claimed is:

1. A method for manufacturing a rotor core using a height detecting device, a lower die including a plurality of projection portions, and a holding member, the method comprising:
   detecting, by the height detecting device, a height of a first projecting portion of the plurality of projection portions formed on the lower die;
   placing a core body including a stack of blank members onto the lower die when the height detecting device has determined that the height of the first projecting portion is within a set range, wherein a magnet insertion hole passes through the core body in a lengthwise direction such that the first projecting portion is positioned in the magnet insertion hole;
   bringing a permanent magnet in the magnet insertion hole into contact with an upper end of the first projecting portion;
   placing the holding member onto the core body after bringing the permanent magnet into contact with the upper end of the first projecting portion, the holding member configured to hold the core body with the lower die; and
   after placing the holding member onto the core body, injecting melted resin into the magnet insertion hole in which the permanent magnet has been inserted.

2. The method according to claim 1,
   wherein said placing the core body onto the lower die includes placing the core body onto the lower die such that the first projecting portion and a pair of second projecting portions of the plurality of projection portions are positioned in the magnet insertion hole, and
   wherein said inserting the permanent magnet into the magnet insertion hole includes inserting the permanent magnet into the magnet insertion hole such that the permanent magnet comes into contact with the upper end of the first projecting portion and the permanent magnet is sandwiched by the pair of second projecting portions.

3. The method according to claim 1,
   wherein said placing the holding member onto the core body includes bringing the permanent magnet in the magnet insertion hole into contact with a lower end of an additional projecting portion formed on the holding member.

4. The method according to claim 1, further comprising:
   removing the lower die and the holding member from the core body after injecting the melted resin into the magnet insertion hole to form a depression on a lower end portion of a solidified resin formed by solidifying the melted resin, the lower end portion corresponding to the first projecting portion; and
   detecting, by a depth detecting unit, whether a depth of the depression is within a set range.

5. The method according to claim 4,
   wherein the depth detecting unit includes a base member, an additional projecting portion formed on the base member, and a contact sensor located on the base member, and
   wherein said detecting whether the depth of the depression is within the set range includes detecting, by the contact sensor, whether the core body is in contact with the contact sensor when the additional projecting portion is positioned in the depression.

6. The method according to claim 4, wherein the depth detecting unit is a depth sensor directly configured to measure the depth of the depression.

7. The method according to claim 4,
   wherein said placing the core body onto the lower die includes placing the core body onto the lower die such that the first projecting portion and a pair of second projecting portions of the plurality of projection portions are positioned in the magnet insertion hole, and
   wherein said inserting the permanent magnet into the magnet insertion hole includes inserting the permanent magnet into the magnet insertion hole such that the permanent magnet comes into contact with the upper end of the first projecting portion and the permanent magnet is sandwiched by the pair of second projecting portions.

8. The method according to claim 4,
   wherein said placing the holding member onto the core body includes bringing the permanent magnet in the magnet insertion hole into contact with a lower end of an additional projecting portion formed on the holding member.

9. The method according to claim 8,
   wherein the depth detecting unit includes a base member, an additional projecting portion formed on the base member, and a contact sensor located on the base member, and
   wherein said detecting whether the depth of the depression is within the set range includes detecting, by the contact sensor, whether the core body is in contact with the contact sensor when the additional projecting portion is positioned in the depression.

* * * * *